United States Patent [19]
Rud, Jr.

[11] Patent Number: 6,047,244
[45] Date of Patent: *Apr. 4, 2000

[54] MULTIPLE RANGE TRANSITION METHOD AND APPARATUS FOR PROCESS CONTROL SENSORS

[75] Inventor: Stanley E. Rud, Jr., Victoria, Minn.

[73] Assignee: Rosemount Inc., Eden Prairie, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/986,047

[22] Filed: Dec. 5, 1997

[51] Int. Cl.$^7$ .............................. G01P 21/00; H04L 27/04

[52] U.S. Cl. .......................... 702/98; 702/105; 375/295; 340/825.06; 364/130

[58] Field of Search ..................... 702/105, 98; 375/295, 375/377; 340/825.06, 825.07; 364/130; 324/207.21, 207.25, 252; 73/756, 724

[56] References Cited

U.S. PATENT DOCUMENTS

| | | | |
|---|---|---|---|
| 4,072,057 | 2/1978 | Yasuhara et al. | 73/718 |
| 4,086,815 | 5/1978 | Asano et al. | 73/721 |
| 4,135,408 | 1/1979 | Di Giovanni | 73/721 |

(List continued on next page.)

FOREIGN PATENT DOCUMENTS

| | | |
|---|---|---|
| 0 363 958 A2 | 4/1990 | European Pat. Off. . |
| 2133215 | 5/1990 | Japan . |
| 2 251 092 | 6/1992 | United Kingdom . |
| WO 95/23361 | 8/1995 | WIPO . |

OTHER PUBLICATIONS

"The Application of Fuzzy Control Systems to Industrial Processes, " P.J. King et al., *Automatica* vol. 13, 1977, pp. 235–242.

"A Control Engineering Review of Fuzzy Systems, " R.M. Tong, *Automatica* vol. 13, 1977, pp. 559–569.

"Development of Fuzzy Algorithms for Servo Systems, " Y.F. Li et al., *IEEE Control Systems Magazine*, Apr. 1989, pp. 65–71.

"Fuzzy Logic Issues for Process Control, " M. Spinrad et al., Honeywell Inc., ISA Paper, 1990, Document No. 0065–2814/90/1123–1128, pp. 1123–1126.

"Fuzzy Logic in Control Systems: Fuzzy Logic Controller — Part I, " C.C. Lee, *IEEE Transactions on Systems, Man, and Cybernetics*, vol. 20, No. 2, Mar./Apr. 1990, pp. 404–418.

"Fuzzy Logic in Control Systems: Fuzzy Logic Controller — Part II," C.C. Lee, *IEEE Transactions on Systems, Man, and Cybernectics*, vol. 20, No. 2, Mar./Apr. 1990, pp. 419–435.

News Release: Omron Electronics, Inc., Schaumburg IL, Jul. 20, 1991.

"Fuzzy Logic Improves on PID Tuning, " K. Parker *Chemical Processing*, Oct. 1991, pp. 31–32.

"Fuzzy–Logic Basics: Intuitive Rules Replace Complex Math, " D. Brubaker, *EDN*, Jun. 18, 1992, pp. 111–116.

"Intelligent Transmitter Brain . . .(1)", by A. Nagayama, Article No. A 02–06, SPECIAL ISSUE: LATEST INTELLIGENT TRANSMITTER. No Date.

"ST 3000 Transmitter and SFC Smart Field Communicator", HONEYWELL, 34–ST–05–01, Jun. 1983.

*Primary Examiner*—Kamini Shah
*Attorney, Agent, or Firm*—Westman, Champlin & Kelly, P.A.

[57] ABSTRACT

A sensor system includes a first sensor for sensing a parameter in a first sensing range and providing a first sensor signal indicative of the parameter. A second sensor senses the parameter in a second sensing range and provides a second sensor signal indicative of the parameter. The second sensing range is larger than the first sensing range and the first and second sensing ranges overlap in a transition overlap region. A sensor output device provides a sensor output signal based on the first and second sensor signals by blending components of the first and second sensor signals according to a blending function such that the sensor output signal is single valued, has no induced hysteresis and is continuously differentiable.

16 Claims, 7 Drawing Sheets

U.S. PATENT DOCUMENTS

| | | | |
|---|---|---|---|
| 4,161,880 | 7/1979 | Prosky et al. | 73/342 |
| 4,364,276 | 12/1982 | Shimazoe et al. | 73/721 |
| 4,370,890 | 2/1983 | Frick | 73/718 |
| 4,370,891 | 2/1983 | Pickering et al. | 73/861.03 |
| 4,437,164 | 3/1984 | Branch, III | 364/571 |
| 4,445,383 | 5/1984 | Binder et al. | 73/718 |
| 4,528,855 | 7/1985 | Singh | 73/721 |
| 4,574,640 | 3/1986 | Krechmery | 73/721 |
| 4,598,381 | 7/1986 | Cucci | 364/558 |
| 4,611,491 | 9/1986 | Brown et al. | 73/517 |
| 4,693,121 | 9/1987 | Nudd, Jr. et al. | 73/706 |
| 4,713,969 | 12/1987 | Ishii | 73/706 |
| 4,732,043 | 3/1988 | Bell et al. | 73/708 |
| 4,773,269 | 9/1988 | Knecht et al. | 73/706 |
| 4,790,192 | 12/1988 | Knecht et al. | 73/721 |
| 4,818,994 | 4/1989 | Orth et al. | 340/870.21 |
| 4,841,776 | 6/1989 | Kawachi et al. | 73/706 |
| 4,926,364 | 5/1990 | Brotherton | 364/581 |
| 4,949,581 | 8/1990 | Rud, Jr. | 73/706 |
| 4,957,087 | 9/1990 | Ota | 123/479 |
| 5,024,100 | 6/1991 | Weinstein | 73/756 |
| 5,043,862 | 8/1991 | Takahashi et al. | 364/162 |
| 5,083,288 | 1/1992 | Somlyody et al. | 364/550 |
| 5,161,110 | 11/1992 | Dorchak | 364/468 |
| 5,186,150 | 2/1993 | Sekine | 123/494 |
| 5,214,576 | 5/1993 | Tani et al. | 364/162 |
| 5,241,651 | 8/1993 | Ueda | 395/61 |
| 5,309,337 | 5/1994 | Beebe | 702/105 |
| 5,353,380 | 10/1994 | Zhang | 395/3 |
| 5,357,879 | 10/1994 | Shiono et al. | 110/188 |
| 5,602,471 | 2/1997 | Muth et al. | 324/207.21 |

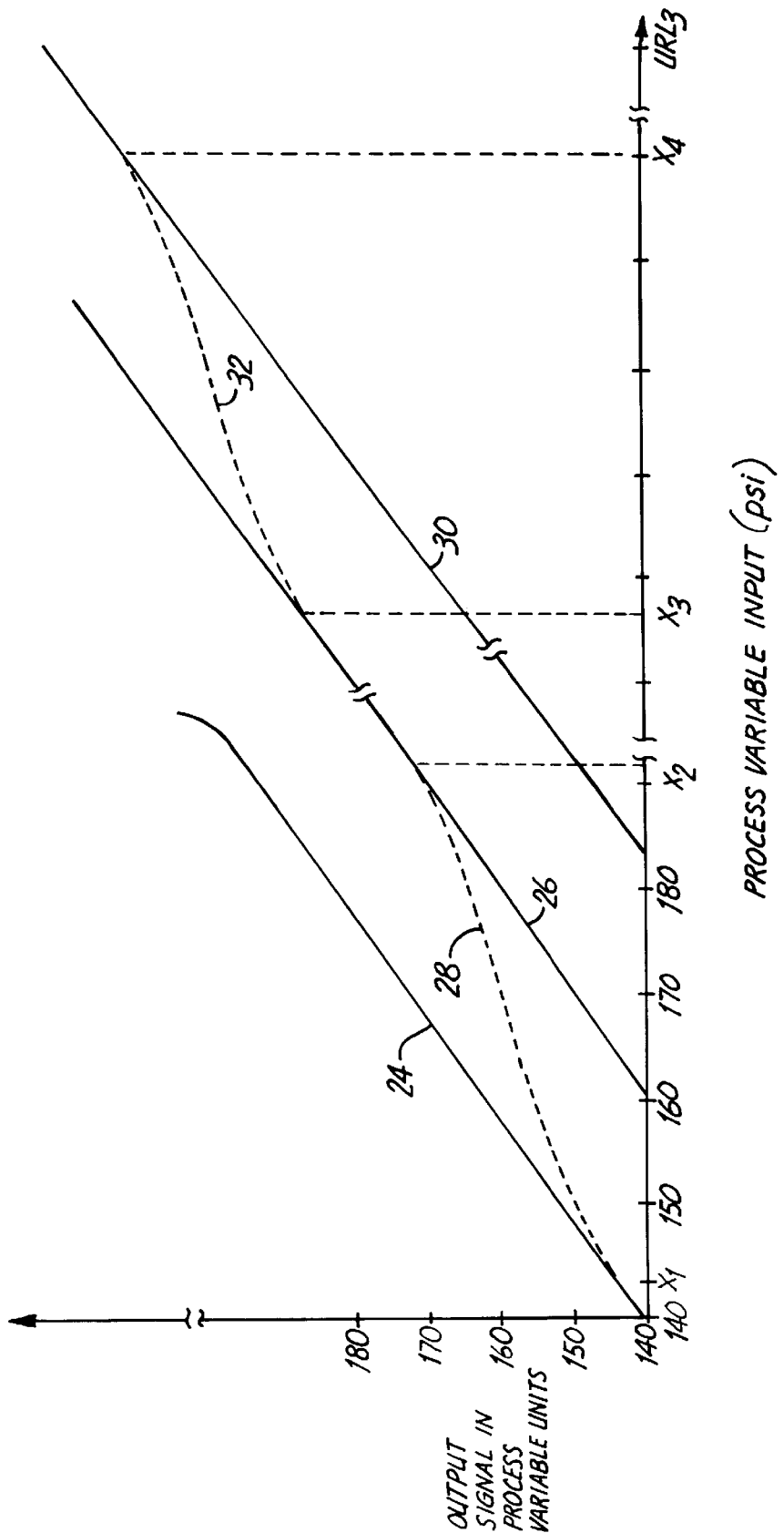

MULTIPLE RANGE TRANSITION METHOD AND APPARATUS FOR PROCESS CONTROL SENSORS

BACKGROUND OF THE INVENTION

The present invention deals with a process control sensor system. More specifically, the present invention deals with a sensor system having multiple sensors and an output device which provides a non-hysteretic output signal with a continuous first derivative in the region where a transition is made between two sensor signals.

Typical autoranging instruments are configured to sense a parameter and provide an output signal indicative of the sensed parameter as the parameter changes over a broad range of values. One such typical autoranging instrument is a digital voltmeter. A digital voltmeter typically has two or more sensor configurations which may include two or more different sensors or a single sensor which can be reconfigured to have two or more gain values. The sensor system provides an output signal indicative of sensed voltage. However, the two or more sensor configurations are used for different ranges. In other words, if the sensed voltage is, for instance, in a range of 0 to 10 volts, a low range sensor configuration is used to provide an output signal indicative of the sensed voltage. However, as the sensed voltage increases in value such as above 12 volts, the total error in the output signal of the first sensor configuration increases rapidly and the output signal from the first sensor configuration eventually becomes less accurate than desired.

Therefore, a second higher range sensor configuration is provided which provides an accurate output signal as the voltage increases. By the same token, however, the second sensor configuration does not provide an output signal which is as accurate (as a percent of the reading) as the voltage decreases below, for example, 10 volts, as does the lower range sensor configuration.

Such prior autoranging instruments are configured to provide an output from the first sensor configuration until the voltage exceeds the preset maximum range value (such as 12 volts). Then, the instrument is configured to abruptly switch the second sensor configuration into the output circuit and provide the system output signal based on the sensor signal from the second sensor configuration as the voltage continues to increase. However, when the voltage decreases such that it falls below a decreasing value (such as 10 volts) the autoranging instrument is configured to abruptly switch back to the first sensor configuration. Thus, such prior systems typically operate with hysteresis in the transition range.

This abrupt switching, and also the hysteresis, typically causes a small shift in the output signal from the instrument due to different calibration errors and non-linearities in each range. This shift in the output and the induced hysteresis provides unacceptable performance in other applications, such as in a pressure transmitter which is used in a precision proportional-integral-derivative (PID) process control loop. The abrupt range change transient causes a large derivative input to the PID control loop which is problematic.

The process control industry has also developed sensors, such as pressure sensors, which provide a highly accurate output signal over different ranges. For example, one such sensor has an upper range limit of 4,000 psi and provides a high level of performance over a calibrated range of approximately 30 to 1 (or from approximately 150 psia to 4,000 psia). However, as the 4,000 psia sensor ranges down below 150 psia, the total error (as a percent of reading) in the output signal increases rapidly and provides a performance level which is less than desired. Other sensors are used to measure pressure ranging from 0 to 200 psia and have been designed to provide a high level of performance over this entire operating range. However, the sensors cannot sense pressures accurately over this upper range limit. The industry has encountered difficulty in smoothly transitioning between the two sensors. As discussed above, this causes problems in PID control loops.

Various analog or digital filtering techniques can be used to compensate for the shift in output during the range transition. However, such techniques often result in a phase lag that can affect the control loop. Also, the resulting hysteresis cannot be filtered out.

SUMMARY OF THE INVENTION

A sensor system includes a first sensor for sensing a parameter in a first sensing range and providing a first sensor signal indicative of the parameter. A second sensor senses the parameter in a second sensing range and provides a second sensor signal indicative of the parameter. The second sensing range is larger than the first sensing range and the first and second sensing ranges overlap in a transition region. A sensor output device provides a sensor output signal based on the first and second sensor signals by blending components of the first and second sensor signals according to a blending function such that the sensor output signal is single valued, has no induced hysteresis and is continuously differentiable.

BRIEF DESCRIPTION OF THE DRAWINGS

FIG. 7 is a graph showing the output of a multisensor system having more than two sensor ranges in accordance with the present invention.

DETAILED DESCRIPTION OF THE PREFERRED EMBODIMENTS

Figure 1:
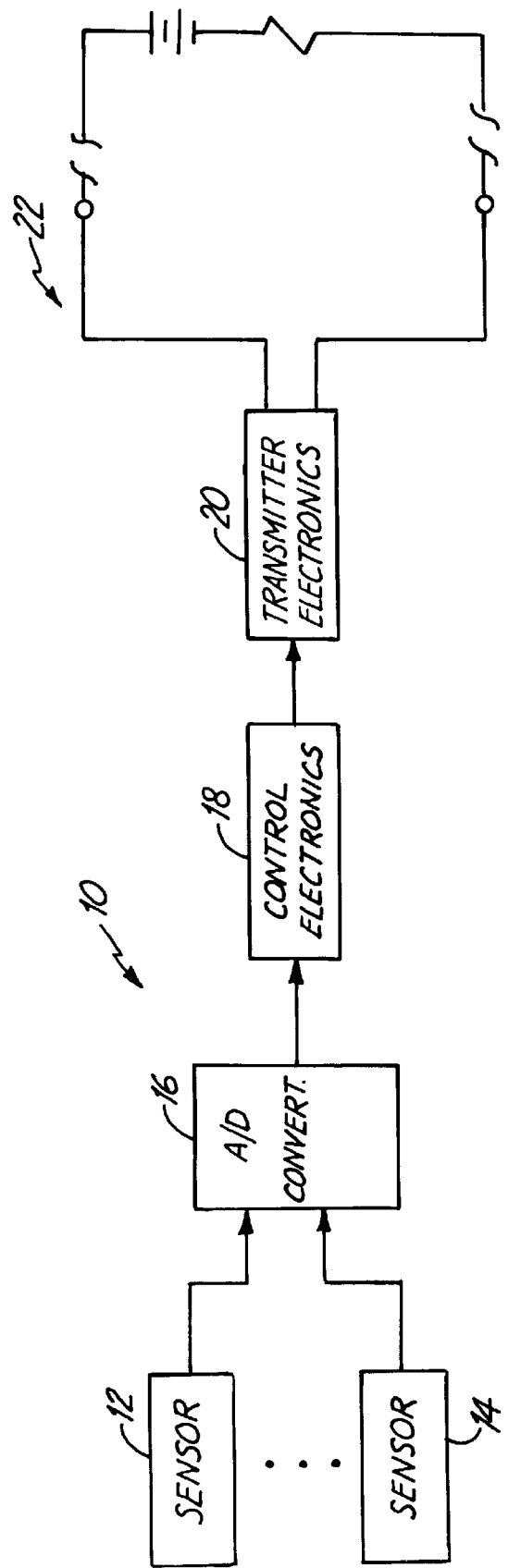
FIG. 1 is a block diagram of a multisensor transmitter system in accordance with the present invention.

FIG. 1 is a block diagram of a multisensor transmitter system 10 (transmitter 10) in accordance with the present invention. Transmitter 10 includes a plurality of sensors 12 and 14, optional analog-to-digital (A/D) converter 16, control electronics 18, transmitter electronics 20 and output signal loop 22. While sensors 12 and 14 can be two discrete range sensors or a single, multi-output range sensor and can be used to sense substantially any parameter which has sensed values that vary over a plurality of ranges, the present invention will proceed (for the sake of clarity) by describing sensors 12 and 14 as individual pressure sensors. For instance, sensors 12 and 14 may preferably be differential, absolute or gauge pressure sensors used in a process control instrument.

Further, it is to be understood that the present invention can be implemented using analog or digital techniques. If using analog processing techniques, A/D converter 16 can be eliminated. Similarly, if sensors 12 and 14 are configured to provide digital output signals, A/D converter 16 can be eliminated as well. However, the present description will proceed with respect to a system implementing A/D converter 16, for the sake of expedience.

In the embodiment shown in FIG. 1, sensors 12 and 14 preferably provide output signals indicative of the sensed pressure to A/D converter 16. A/D converter 16 converts the sensor signals to digital values and provides the digital values to the control electronics 18. The control electronics 18 typically includes signal conditioning and correction circuitry which corrects the sensor signals for various errors and non-linearities (such as induced by changes in static pressure, differential pressure and temperature) in a known manner. The control electronics 18 then provides one output signal, based on two or more input signals received from sensors 12 and 14, to transmitter electronics 20. The transmitter electronics 20 provides an output signal, based on the pressure sensed, to loop 22. In the preferred embodiment, loop 22 is a 4–20 mA current loop modeled by a series connected battery and resistive load. Transmitter 10 is also preferably powered wholly by current loop 22. Transmitter electronics 20 provides the output signal on loop 22 according to standardized two-wire 4–20 mA current loop transmitter communications protocols. Loop 22 is a fully analog loop, where no digital communication is present and the current is representative of some process variable or of a control signal. Other standardized transmitter communication protocols may be used. Digital signals may also be output on the 4–20 mA current loop, as in a HART®, MODBUS® or DE implementation of loop 22. Alternatively, transmitter 10 may output a digital signal as in FIELDBUS, and all information output by transmitter 10 (arid present on loop 22) is represented by a digital signal.

In the embodiment shown in FIG. 1, sensor 12 is calibrated for a lower range of operation and provides a highly accurate output signal indicative of pressure in the lower range. Sensor 14 is calibrated for a higher range of operation and provides a highly accurate output signal indicative of pressure in the higher range.

Control electronics 18 determines, based on the pressure range being sensed, whether the values corresponding to the sensor signal from sensor 12, or the values corresponding to the sensor signal from sensor 14 are to be provided to transmitter electronics 20. In the preferred embodiment, control electronics 18 provides only the values associated with the sensor signal from sensor 12 when the pressure is below a certain limit. Also, control electronics 18 provides only the values associated with the sensor signal from sensor 14 when the pressure is above another limit. In the transition region between the two limits, (where control electronics 18 is switching between use of the output from sensor 12 to use of the output from sensor 14, or vice versa) control electronics 18 blends components of the two signals from sensors 12 and 14 to provide an output signal which represents a smooth transition between sensors 12 and 14. By "smooth", it is meant that the output signal in the transition range is single valued, without induced hysteresis and continuously differentiable (i.e., the resulting output signal intersects tangentially with the sensor outputs at each of the two respective limits). Single valued means that each input value corresponds to a unique output value; multiple valued means that an input value corresponds to multiple output values and/or vice versa.

Figure 2:
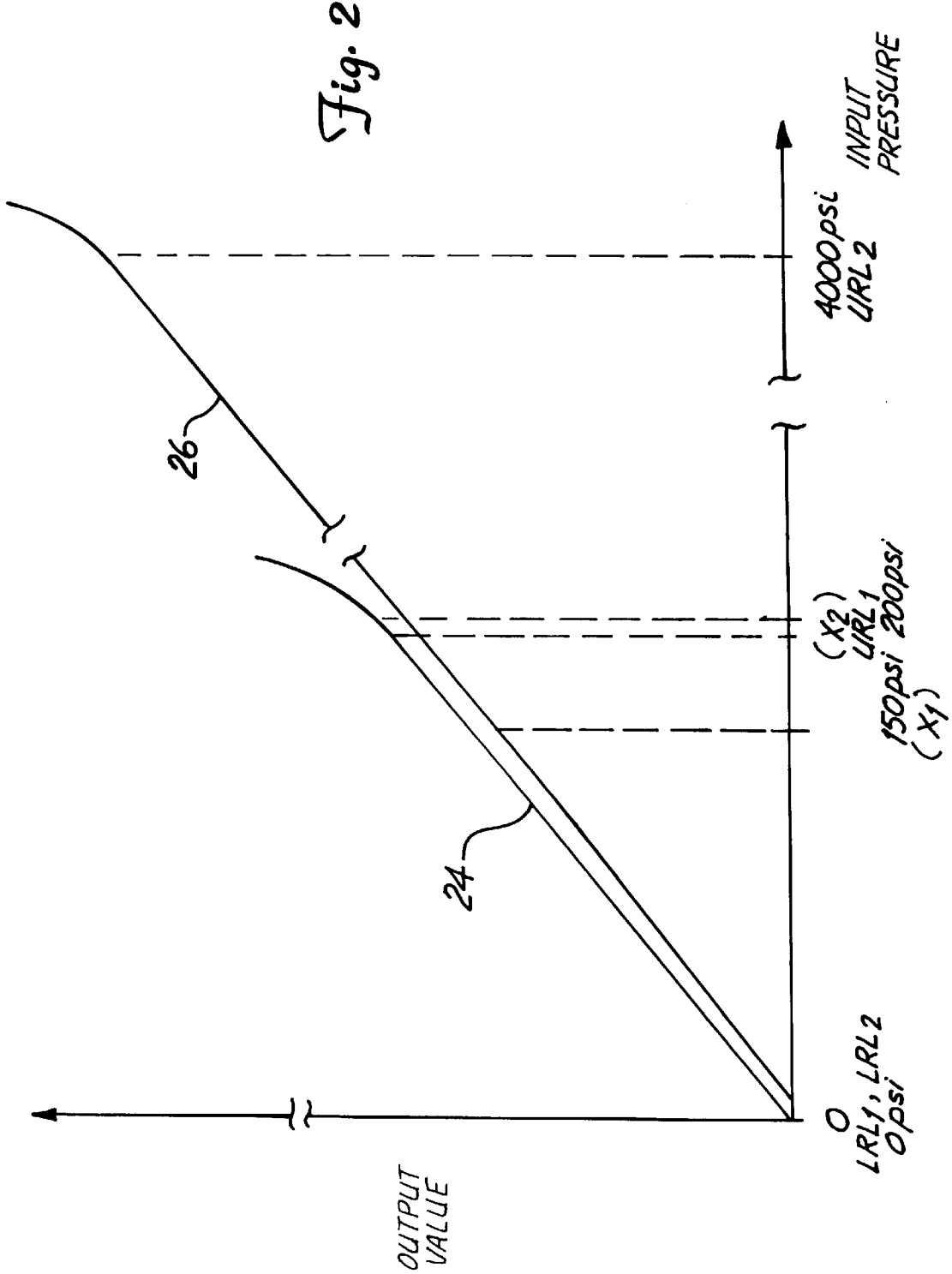
FIG. 2 is a graph showing the sensor output of a multisensor system.

FIG. 2 is a graph of the digital output value for one embodiment of sensors 12 and 14 plotted against the input pressure sensed by sensors 12 and 14. The line designated 24 corresponds to the output from sensor 12 while the line designated 26 corresponds to the output from sensor 14. FIG. 2 shows that the output 24 from sensor 12 runs from a lower range limit ($LRL_1$) which is preferably 0 psi to an upper range limit ($URL_1$) which is, in this embodiment, 200 psi. Similarly, the output 26 from sensor 14 runs from a lower range limit ($LRL_2$) of 0 psi all the way to an upper range limit ($URL_2$) which is 4000 psi.

The outputs 24 and 26 are shown as separated in the transition region (i.e., from $x_1$ to $x_2$). The output signals from sensors 12 and 14 are typically not identical in that region. Sensor 14 is calibrated to provide an output which can be relied upon in the range from a lower transition limit $x_1$ to $URL_2$. Therefore, it is desirable to use sensor 14, at least to some degree, over that level of input pressure. Similarly, since sensor 12 is calibrated to provide an output which is more accurate than sensor 14 in a region $LRL_1$ to $URL_1$, it is desirable to use the output from sensor 12, at least to some degree, over that entire range of input pressures. In the transition range, which can be the entire range between $x_1$ and $URL_1$, or a more narrow transition range within those two bounds (i.e., $x_1$ to $x_2$), it is desirable to use components of the output signals from both sensors 12 and 14 to accommodate a smooth transition between sensors 12 and 14.

Figure 3:
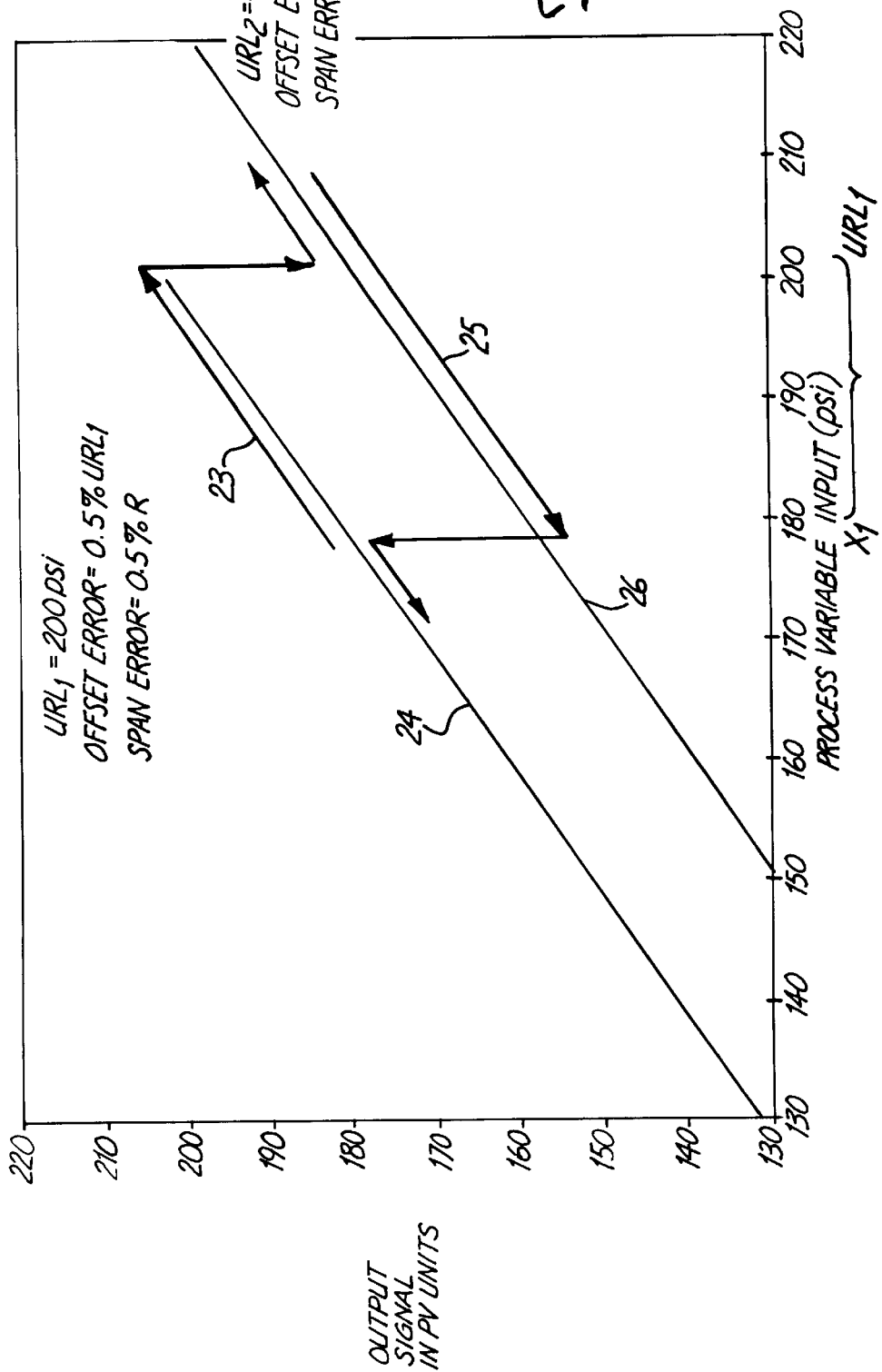
FIG. 3 is a graph showing the output of a multisensor system using an abrupt switching technique.

FIG. 3 is an enlarged graph of the transition region shown in FIG. 2 where the blending function according to the present invention is not used, or where it is inappropriately implemented. For purposes of the present discussion, it is assumed that sensor 12 is a pressure sensor calibrated to operate in a range of 0 to 200 psi, and sensor 14 is a pressure sensor calibrated to operate in a range from 0 psi to 4,000 psi.

In the system operating in accordance with FIG. 3, the output 24 (from sensor 12) is used until the upper range limit ($URL_1$) of sensor 12 is reached. Then, as the pressure increases beyond $URL_1$, the system abruptly switches to using the output 26 (from sensor 14) through the upper range of pressures all the way up to the $URL_2$ of sensor 14. This is indicated by arrow 23. However, as the pressure decreases, the system uses the output 26 until the pressure decreases to the lower transition limit which is represented in FIG. 3 by $x_1$. Then, the system abruptly switches to again use output 24 from sensor 12 in the lower range. This is indicated by arrow 25.

It can be seen that this type of system induces hysteresis in the transition range represented by $x_{1\ to\ URL1}$. Also, the abrupt switching between outputs 24 and 26 yields a sensor output signal having a discontinuous first derivative which is then provided from control electronics 18 to transmitter electronics 20. This type of abrupt shift and the associated induced hysteresis is unacceptable in a pressure transmitter used in a precision process control loop. Furthermore, if the control loop is controlling the process using a proportional-integral-derivative (PID) function, the control is based on a derivative of the signal. The derivative of the output signal shown in FIG. 2 would tend to plus or minus infinity at the start and the end of the transition due to the step in output signal from the transmitter. This is unacceptable for precision control. Also, if the operating pressure was frequently varying above and below the transition range $x_1$ to $URL_1$, the output of the transmitter would likely constantly be switching between outputs 24 and 26. This is highly undesirable.

Figure 4:
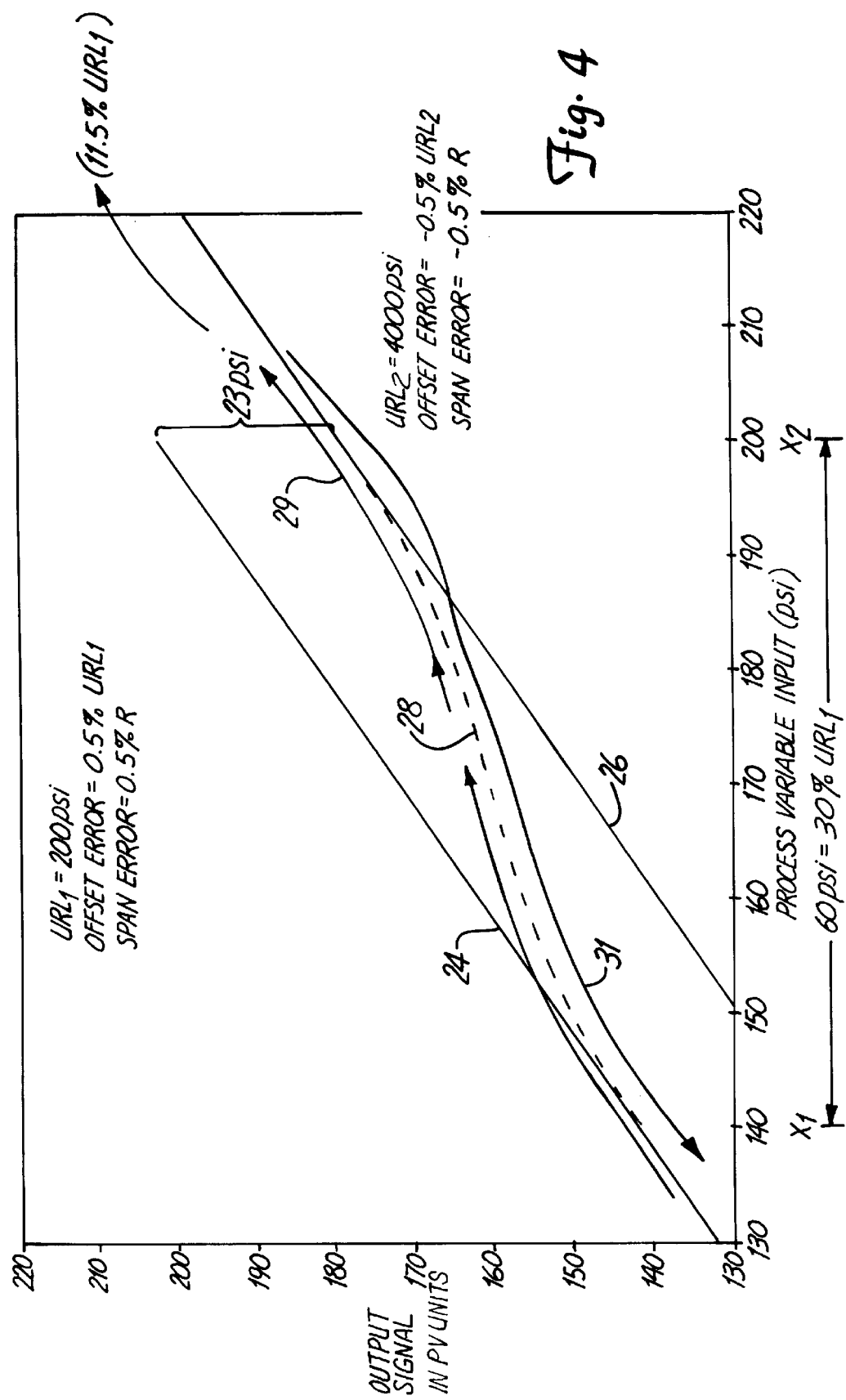
FIG. 4 is a graph showing the output of a multisensor system in accordance with the present invention.

FIG. 4 is a graph showing the output of control electronics 18 using a blending function according to the present invention. Similar items to those shown in FIGS. 2 and 3 are similarly numbered. As with the system illustrated in FIGS. 2 and 3, if the sensed pressure is below the lower transition limit $x_1$, then control electronics 18 bases its output signal only on the values corresponding to the sensor signal 24 from sensor 12. In addition, as the pressure ranges above an upper transition limit $x_2$ (which may be the same or less than $URL_1$), control electronics 18 provides an output which is based only on the values associated with the output signal 26 from sensor 14.

However, in the transition region (shown in FIG. 4 as $x_1$ to $x_2$), control electronics 18 does not simply abruptly switch between outputs 24 and 26. Instead, control electronics 18 implements a blending function which blends components of outputs 24 and 26 to obtain a smooth transition 28 between the two outputs. As the pressure ranges upward toward $x_2$ the blending function more heavily weights output 26 from sensor 14. This is indicated by arrow 29. As the pressure ranges downward toward $x_1$, the blending function more heavily weights signal 24 from sensor 12. This is indicated by arrow 31. Also, in the preferred embodiment, the blending function is such that it is tangent to output 24 at $x_1$ and tangent to output 26 at $x_2$. This provides for a smooth and continuous transition between outputs 24 and 26, with no abrupt changes, multiple values, discontinuities in the first derivative or hysteresis. This significantly enhances the performance of a multisensor transmitter 10.

Figure 5:
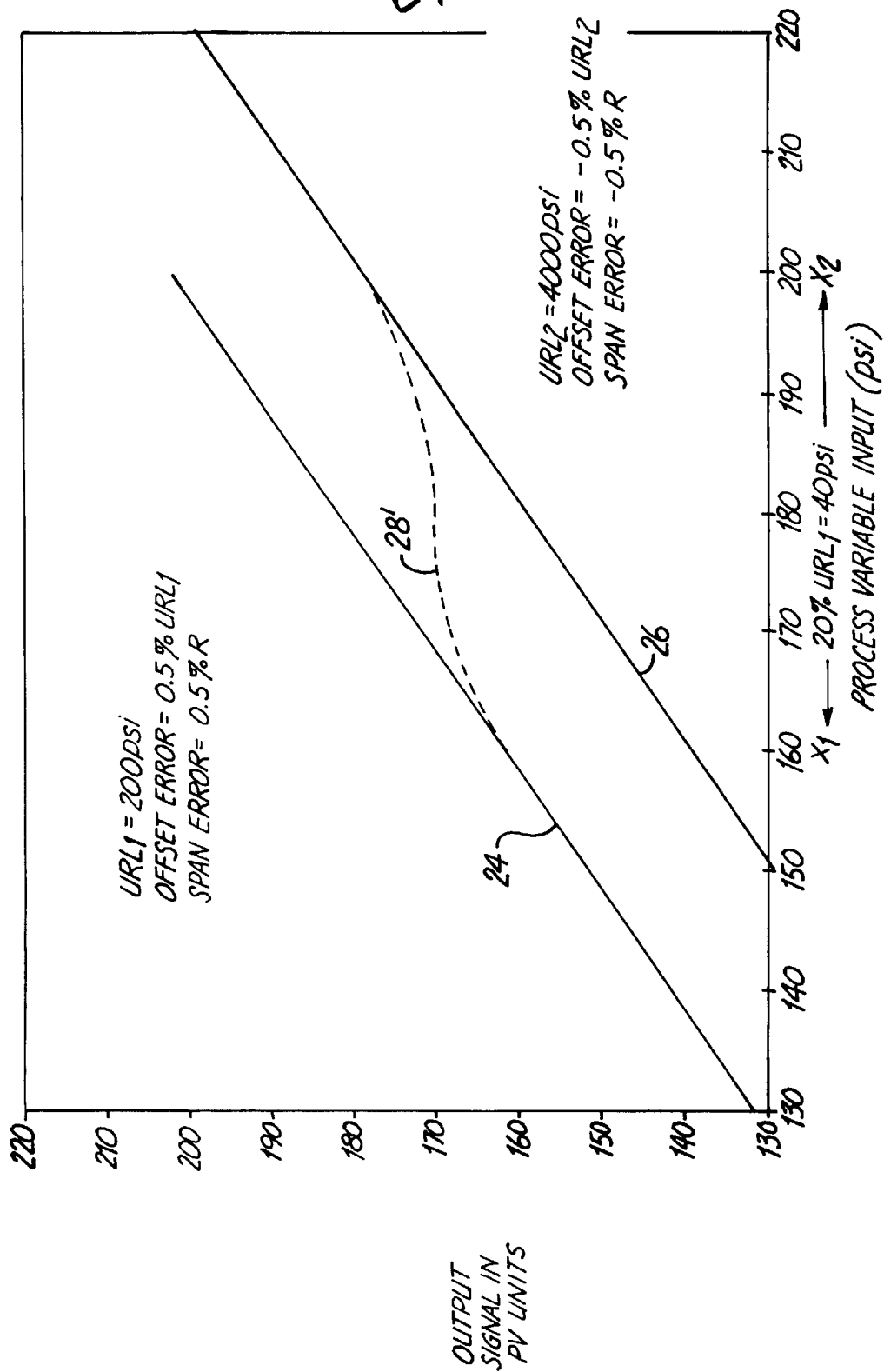
FIG. 5 is a graph showing the output of a multisensor system having a narrower transition range than that shown in FIG. 4.

FIG. 5 is a graph showing the output of multisensor system 10 having a transition range which is narrower than that shown in FIG. 4. Similar items are similarly numbered to those shown in FIG. 4. The difference is that, instead of having a transition range between outputs 24 and 26 which extends between 140 psi and 200 psi, the transition range shown in FIG. 5 extends only between 160 psi and 200 psi. Implementing a blending function according to the present invention results in dashed line 28' which represents the output in the transition range, It can be seen that, in the central region of line 28', line 28' is nearly multiple valued. Since line 28' is not multiple valued and is continuously differentiable, it is acceptable for use in the present invention. However, it is preferable to have an output similar to that represented by line 28 in FIG. 4.

Figure 6:
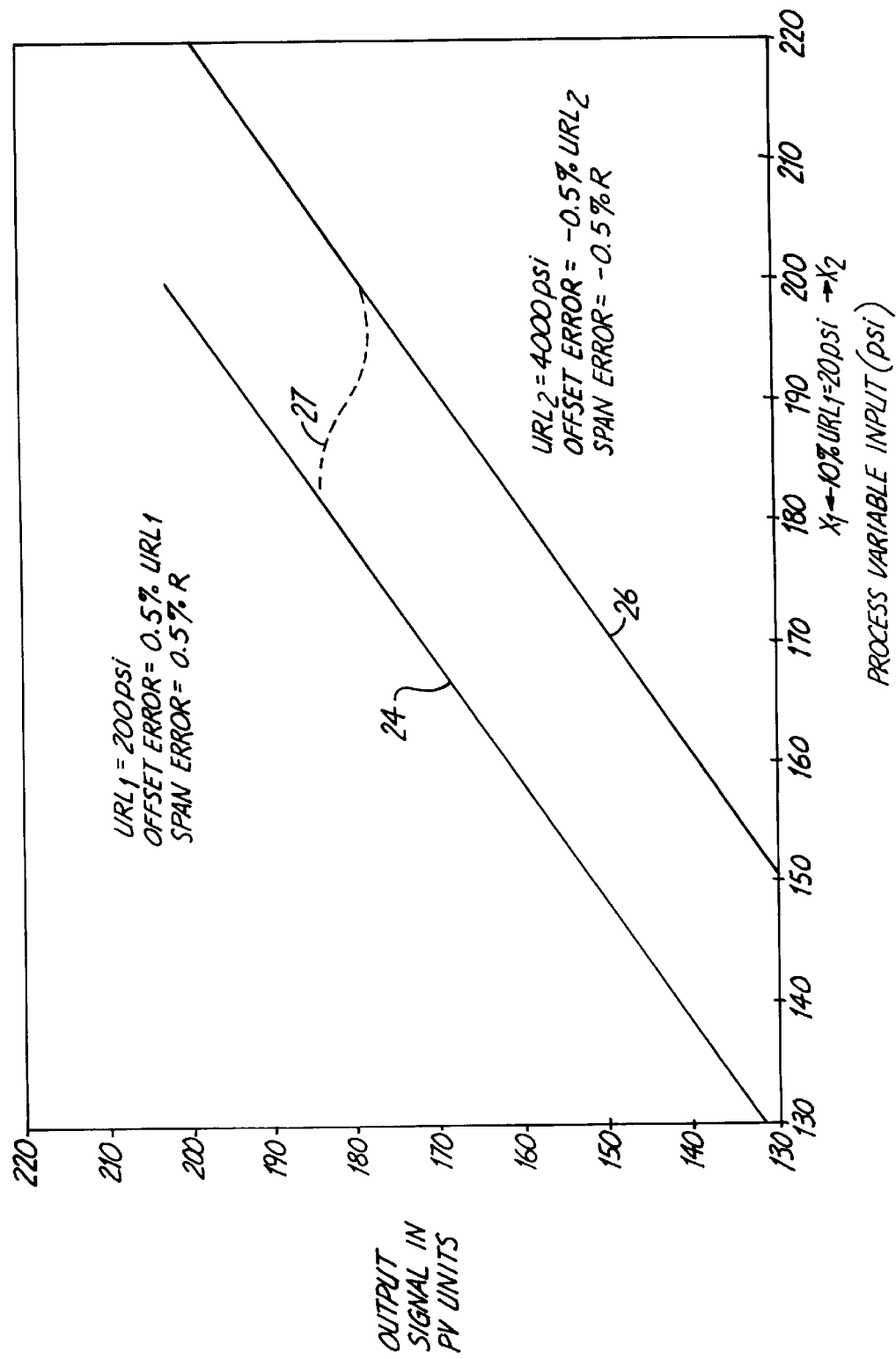
FIG. 6 is a graph showing the output of a multisensor system having a narrower transition range than that shown in FIG. 5.

FIG. 6 is a graph showing the output of multisensor system 10 having even a narrower transition range than that shown in FIG. 5. This results in the transition represented by line 27. The transition range shown in FIG. 6 extends only from 180 psi to 200 psi. Signals 24 and 26 are separated by a pressure error of 23 psi which is approximately 11.5% of $URL_1$.

It has been observed that the ratio of the width of the transition range $x_2-x_1$ to the absolute value of the pressure error separating the two curves at $x_2$ should be in excess of approximately 2.0. If such ratio is less than approximately 2.0, the output becomes multiple valued.

It is preferred that the transition range be wide enough such that the slope of the blended function approximates the slope of the sensor outputs 24 and 26, but narrow enough to receive the benefit of the accuracy of the lower range sensor output 26. In one embodiment in which the transition range is defined as 30% of $URL_1$ (or 60 psi), and the pressure error separating the two curves is 23 psi at $x_2$ (which equals $URL_1$ in this example), this resulted in a transition curve having the favorable characteristics indicated by dashed line 28 shown in FIG. 4. The graph shown in FIG. 4 was generated using an offset error of −0.5% of $URL_2$ and a span error of −0.5% of reading for sensor 14 (which has an upper range limit of 4000). Similarly, an offset error of +0.5% of $URL_1$ and span error of +0.5% of reading was used for sensor 12 (which has an upper range limit of 200). Therefore, multiplying the offset error by the upper range limit of both sensors and the span error by $URL_1$ yields a difference between the two curves of 23 psi at $URL_1$. The width of the transition range over which the two curves are blended is 60 psi (or 30% of $URL_1$). This provides a favorable output transition between the two sensor outputs 24 and 26. Thus, the transition range width is 60 psi and the pressure error at $URL_1$ is 23 psi which results in an acceptable ratio of approximately 2.6.

In one preferred embodiment, the blending function is a cosine function. Letting $f_1(x)$ represent the sensor output where the pressure is in a range between 0 and $URL_1$ shown in FIG. 4 (i.e., output 24) and letting $f_2(x)$ be the output function where the pressure is in a range of 0 to $URL_2$ (i.e., output 26) then the blended function 28 is represented by $f_3(x)$ and is used to compute the output in the transition region between $x_1$ and $x_2$ as follows:

$$f_3(X) = \left[\frac{1}{2}\cos\left[\frac{\pi(X-X_1)}{X_2-X_1}\right] + \frac{1}{2}\right][f_1(X) - f_2(X)] + f_2(X) \qquad \text{Equation 1}$$

This technique properly blends the two sensor outputs 24 and 26 together in the transition range between $x_1$ and $x_2$, while using the appropriate individual sensor output 24 or 26 above or below the transition range. Thus, Equation 1 represents a properly scaled cosine weighting function which smoothly blends the two sensor outputs in the transition range.

It can be seen from FIG. 4 that the smooth transition provides an output which has a first derivative (or rate of change) which is simply a sine function rather than a large spike in the output signal as illustrated in FIG. 3. The single valued transition algorithm $f_3(x)$ from $f_1(x_1)$ to $f_2(x_2)$ also induces no artificial hysteresis in the output.

FIG. 7 simply illustrates the output of the present system used with a three sensor instrument. Similar items to those shown in FIG. 4 are similarly numbered. The transition between outputs 24 and 26 is accomplished the same way as described with respect to FIG. 4. However, an additional output 30, from a third sensor is also provided with even a higher upper range limit $URL_3$ than the sensor associated with output 26. The third sensor also has a lower transition point represented by $x_3$ and an upper transition limit represented by $x_4$ which is less than or equal to $URL_4$. Therefore, a second transition range $X_3$ to $X_4$ is obtained in which control electronics 18 must switch between output 26 and output 30. In the preferred embodiment, control electronics 18 implements a similar blending function as that described with respect to FIG. 3 in order to obtain a smooth and continuous transition 32 between outputs 26 and 30 as the sensed pressure moves through transition range $x_3$ to $x_4$.

While the present description has proceeded with respect to a cosine blending function, other appropriate blending functions could also be used. For example, a polynomial function, or a set of exponential functions, could also be used to provide the smooth and continuous blending in the transition region to optimize the blended output for certain properties of the control loop.

It should be noted that, in the transition region, values from both sensors are preferably acquired. In one preferred embodiment, a switching circuit is provided in A/D converter 16 which alternately switches in the inputs from the sensors. This embodiment conserves current because the unused sensors are switched off. This technique can introduce a phase lag which is proportional to the duty cycle of the switch. Therefore, in another preferred embodiment, all sensors are always on and A/D converter 16 includes two portions which are constantly converting the signals from sensors 12 and 14 and making the two outputs available to control electronics 18 for correction and implementation in the blending function.

Also, it should be noted that the sensors may provide output signals which range over the same values based on the sensed variable regardless of the range of inputs. For example, sensor 12 may provide an output signal which ranges from 0–100 mA based on an input of 0 psi to 200 psi. Also, sensor 14 may provide an output signal which ranges from 0–100 mV based on an input of 0–4000 psi. Such outputs must be corrected to an appropriate level prior to blending. This correction is done in a known fashion.

The blending function can also be implemented in software, in which case control electronics 18 includes a digital processor or microcontroller. Appropriate memory coefficients are then stored in memory for use in implementing the blending and other discussed function. The blending function can also be implemented in analog circuitry in control electronics 18. Suitable filtering and averaging techniques can be applied to the corrected outputs and/or to the blended outputs from control electronics 18 in order to reduce transmitter and process induced noise.

Although the present invention has been described with reference to preferred embodiments, workers skilled in the art will recognize that changes may be made in form and detail without departing from the spirit and scope of the invention.

What is claimed is:

1. A sensor system for use in sensing a process variable in an industrial process, comprising:

a first sensor for sensing the process variable in a first sensing range and providing a first sensor signal indicative of the variable sensed;

a second sensor for sensing the variable in a second sensing range and providing a second sensor signal indicative of the variable sensed, the second sensing range being larger than the first sensing range, the first and second sensing ranges overlapping in an overlap range proximate to an upper range limit of the first sensing range; and a sensor output device operably coupled to the first and second sensors and providing a sensor output signal based on one of the first sensor signal, the second sensor signal and a blended signal, the blended signal being based on the first and second sensor signals and being formed according to a blending function forming a "smooth" curve between the first and second sensor signals in the overlap range in which the blended signal is continuously differentiable and includes no hysteresis.

2. The sensor system of claim 1 wherein the variable comprises pressure and wherein the first and second sensors, respectively, comprise:

a first pressure sensor having a first upper range limit (URL) and providing the first sensor signal indicative of pressure; and a second pressure sensor having a second URL higher than the first URL and providing the second sensor signal indicative of pressure.

3. The sensor system of claim 1 wherein the sensor output device is configured to "blend" the first and second sensor signals using a cosine function.

4. The sensor system of claim 1 wherein the sensor output device is configured to blend the first and second sensor signals using a combination of exponential functions.

5. The sensor system of claim 1 wherein the sensor output device is configured to blend the first and second sensor signals using a polynomial function.

6. The sensor system of claim 1 and further comprising:

a transducer coupled to the sensor output device and providing an output according to a standardized communications protocol over the first and second sensor ranges based on the sensor output signals and the blended signal.

7. The sensor system of claim 6 wherein the transducer and sensor output device comprise a transmitter and wherein the standardized communications protocol is 4–20 mA current loop.

8. The sensor system of claim 7 wherein the standardized communications protocol includes a digital signal.

9. The sensor system of claim 6 wherein the standardized communications protocol is fully digital.

10. The sensor system of claim 2 wherein the sensor output signal is formed according to the blending function over a transition range sufficiently wide to avoid a multiple valued blended signal.

11. A method of obtaining a signal from a sensor structure indicative of a measured process variable, the sensor structure having a plurality of sensors, each sensor providing a sensor signal with a corresponding range, the ranges of the sensors at least partially overlapping in one or more overlap ranges, the method comprising:

transitioning between a first sensor signal and a second sensor signal in a transition range corresponding to at least a portion of the overlap range by deriving a combined output as a function of both the first and second sensor signals, the combined output blending smoothly with the first sensor signal and the second sensor signal in which the combined output is continuously differentiable and includes no hysteresis.

12. The method of claim 11 wherein deriving a combined output comprises:

blending the first and second sensor signals according to a blending function tangent to the first sensor signal at a point of intersection with the first sensor signal and tangent to the second sensor signal at a point of intersection with the second sensor signal.

13. The method of claim 11 wherein deriving a combined output comprises:

blending the first and second sensor signals according to at least one of a cosine function, a plurality of exponential functions and a polynomial function.

14. The method of claim 11 wherein deriving a combined output comprises:

blending the first and second sensor signals over a transition range having a width sufficiently wide to avoid a multiple valued blended signal.

15. A transmitter providing an output based on a sensed pressure, comprising:

a first pressure sensor having a first range with a first upper range limit (URL) and providing a first sensor signal indicative of pressure;

a second pressure sensor having a second range with a second URL higher than the first URL and providing a second sensor signal indicative of pressure, the first and second ranges overlapping in a transition region proximate and lower than the first URL; and an electronic output circuit providing a sensor output signal to be used in forming the output, the sensor output signal being based on one of the first and second sensor signals when the sensed pressure is outside the transition region and a combination of the first and second sensor signals when the sensed pressure is within the transition region, the electronic output device providing the combination by blending the first and second sensor signals to obtain a smooth transition between the first and second sensor signals in which the sensor output signal is continuously differentiable and includes no hysteresis.

16. The transmitter of claim 15 and further comprising:

a third pressure sensor having a third range with a third URL and providing a third sensor signal indicative of pressure, the second and third ranges overlapping in a second transition region proximate and lower than the second URL; and wherein the electronic output device provides the sensor output signal based on the third sensor signal when the sensed pressure is above the second transition region and based on a combination of the second and third sensor signals when the sensed pressure is within the second transition region, the electronic output device providing the combination by blending the second and third sensor signals to obtain a smooth transition between the first and second sensor signals.

* * * * *